United States Patent [19]

Keppler

[11] Patent Number: 4,802,377
[45] Date of Patent: Feb. 7, 1989

[54] GANTRY ARRANGEMENT FOR AN INDUSTRIAL ROBOT

[75] Inventor: Rainer Keppler, Baiersdorf, Fed. Rep. of Germany

[73] Assignee: Manutec Gesellschaft für Automatisierungs- und Habungssysteme GmbH, Fürth, Fed. Rep. of Germany

[21] Appl. No.: 886,536

[22] Filed: Jul. 16, 1986

[30] Foreign Application Priority Data

Sep. 12, 1985 [DE] Fed. Rep. of Germany ....... 3532588

[51] Int. Cl.$^4$ ..................... F16H 19/04; F16H 57/12; F16C 29/04
[52] U.S. Cl. .................................... 74/422; 74/409; 384/48; 901/16
[58] Field of Search .............. 414/684.3; 74/422, 409, 74/89.12, 89.15; 105/148, 154; 901/16; 212/142.1, 126, 131; 248/657, 668, 669, 429; 384/53, 48, 43; 104/118

[56] References Cited

U.S. PATENT DOCUMENTS

| | | | |
|---|---|---|---|
| 3,319,802 | 5/1967 | Osawa | 212/142.001 |
| 3,359,819 | 12/1967 | Veillette et al. | 74/409 |
| 4,044,688 | 8/1977 | Kita | 104/118 |
| 4,054,330 | 11/1977 | Luo | 384/53 |
| 4,128,278 | 12/1978 | Headen et al. | 384/43 |
| 4,162,103 | 7/1979 | Georg et al. | 74/422 |
| 4,457,567 | 7/1984 | Kraan | 384/53 |
| 4,534,006 | 8/1985 | Minucciani et al. | 901/16 |
| 4,597,707 | 7/1986 | Cornacchia | 901/16 |

FOREIGN PATENT DOCUMENTS

| | | | |
|---|---|---|---|
| 1352964 | 1/1964 | France | 384/43 |
| 743862 | 6/1980 | U.S.S.R. | 901/16 |

OTHER PUBLICATIONS

Ehmer and Wolf, "Entwicklung und Einsatz von Industrie-Robotern im Fahrzeugbau", *Werkstatt und Betrieb*, Jun. 1976, vol. 6, pp. 305 and 315.

Primary Examiner—Allan D. Herrmann
Attorney, Agent, or Firm—Kenyon & Kenyon

[57] ABSTRACT

In a gantry arrangement or mechanical guidance assembly for an industrial robot, a carriage supporting the robot is mounted on an elongate guide element of circular cross-section extending parallel to the robot travel path. Rotation of the robot carriage about the circular guide element is prevented by the bracing of the carriage against an elongate guide element having a rectangular cross section, the bracing being effectuated by at least two rollers rotatably mounted to the carriage and rollably engaging the rectangular guide element.

5 Claims, 3 Drawing Sheets

GANTRY ARRANGEMENT FOR AN INDUSTRIAL ROBOT

This invention relates to an gantry arrangement for an industrial robot, the arrangement including a gantry beam and a gantry carriage on which the industrial robot is disposed.

Many varied designs for gantry equipment in robot assemblies are known (see, for example, the journal *Werkstatt und Betrieb,* 1976, No. 6, page 305 or 315). Generally, a carriage supporting an industrial robot is suspended from a conventional gantry structure. By moving the carriage and, optionally, the gantry itself, a relatively large working area can be covered.

Gantry structures in industrial robot assemblies, as well as other structures, are advantageously designed so that the structures can be assembled in the manner of building blocks to form the required dimensions. However, if very long gantry structures are involved, difficulties arise with respect to the secure support of the carriage without play.

An object of the present invention is to provide an improved gantry arrangement of the above-described type for industrial robots.

A more particular object of the present invention is to provide such an improved gantry arrangement in which proper guidance of the carriage is achieved with greater, as well as lesser, gantry lengths.

SUMMARY OF THE INVENTION

In accordance with the present invention, a gantry arrangement for an industrial robot comprises a gantry beam defining a path of travel of the industrial robot, a support for holding the gantry beam, a first elongate guide element, a second elongate guide element and a carriage. The first elongate guide element has a circular transverse cross-section and extends parallel to the travel path of the industrial robot. The second elongate guide element has a substantially rectangular transverse cross section and also extends parallel to the robot travel path. Both of the guide elements are secured to the gantry beam and are made of a rigid material. The guide elements are spaced from one another. At least one ball sleeve is provided for shiftably mounted the carriage to the first elongate guide element so that the carriage is shiftably supported by that guide element for motion along the travel path. At least two rollers are rotatably mounted to the carriage and engaged with the second elongate guide element for bracing the carriage and preventing rotation thereof about the first elongate guide element.

A guidance system or gantry arrangement in accordance with the present invention ensures, despite the possible existence of large temperature differences, unencumbered motion of the carriage along the gantry beam. Jamming is entirely eliminated.

In accordance with a specific feature of the present invention, the gantry beam preferably comprises a square hollow profile with welded-on support strips by means of which strips the elongate guide elements are attached to the gantry beam.

The present invention is also directed to a method of fabricating a gantry arrangement for an industrial robot wherein the gantry arrangement includes a gantry beam defining a path of travel of the industrial robot, wherein a plurality of elongate guide elements are secured to the gantry beam and extend parallel to the robot travel path, and wherein a carriage is shiftably mounted to the guide elements and support strips couple the guide elements to the gantry beam. The method in accordance with the invention comprises the steps of welding the support strips to the gantry beam and subsequently machining those strips for receiving respective ones of the guide elements.

A fabrication method in accordance with the present invention provides enhanced accuracy with respect to form an position deviations inasmuch as during operation of the gantry arrangement, intrinsic deflection of, or bends in, the gantry beam cannot have an effect on the guidance of the robot carriage.

The drive and power supply for the robot carriage can take a conventional form. For example, a drag-chain arrangement is advantageously provided on the gantry beam.

DETAILED DESCRIPTION

Figure 1:
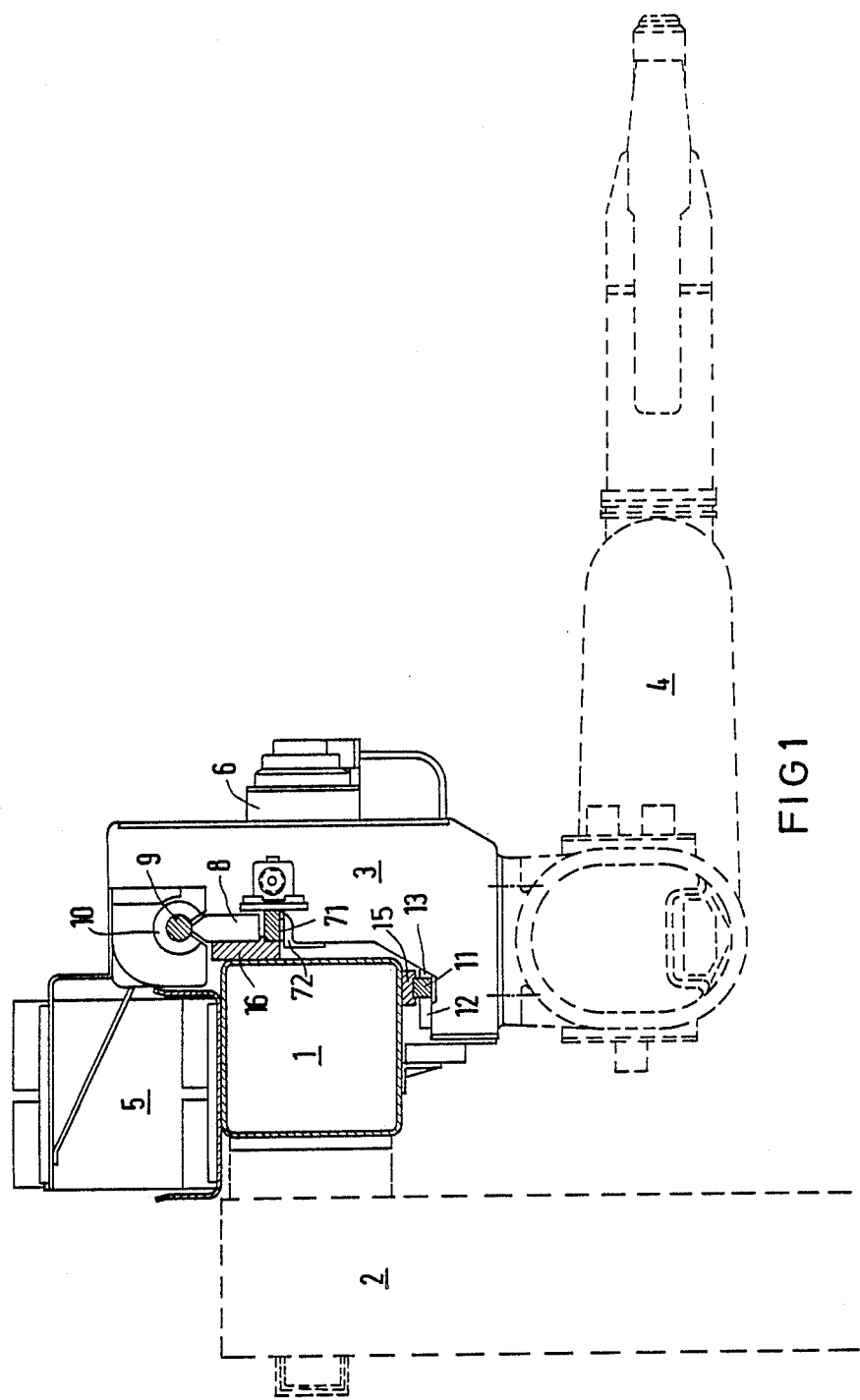
FIG. 1 is a transverse cross-sectional view of a gantry arrangement in accordance with the present invention, showing a first elongate guide element of circular cross-section and a second elongate guide element of substantially rectangular cross-section.

As illustrated in FIG. 1, a mechanical guidance assembly for an industrial robot 4 comprises a hollow gantry beam 1 having a rectangular profile. Gantry beam 1 defines a path of travel of industrial robot 4 perpendicular to the plane of the drawing. Gantry beam 1 is supported above a floor or other base by means of a plurality of support posts 2.

Industrial robot 4 is fastened to a carriage 3 in turn movably mounted to gantry beam 1 for motion along the robot travel path defined thereby.

Welded to a lower side of gantry beam 1 is a first support strip 15 extending longitudinally parallel to gantry beam 1 and concomitantly parallel to the travel path of robot 4. A flat elongate guide 11 in the form of a steel strip of rectangular cross section is attached to support strip 15.

Another support strip 16 is attached to a lateral side of gantry beam 1 proximately to an upper side thereof and likewise extends in a longitudinal direction parallel to the robot travel path defined by gantry beam 1. A plurality of shaft connectors or supports 8 having a high moment of inertia are fastened to support strip 16 at spaced intervals therealong. On shaft supports 8 rests a precision steel shaft 9 of circular cross section. Steel shaft 9 extends in the longitudinal direction, i.e., parallel to the robot travel path defined by gantry beam 1, and serves as an elongate guide element for carriage 3.

Carriage 3 is mounted to steel shaft 9 by means of a plurality of pretensioned ball sleeves 10 (only one shown in the drawings) each characterized by a substantial stiffness and having a circulating ball guiding system. Carriage 3 is braced against rotation about steel shaft 9 by means of four cam rollers 12 and 13 (only two rollers shown in the drawing) rotatably coupled to carriage 3 and rollably engaging steel strip 11. The rollers may be mounted so that they can be set via eccentrics.

Figure 2:
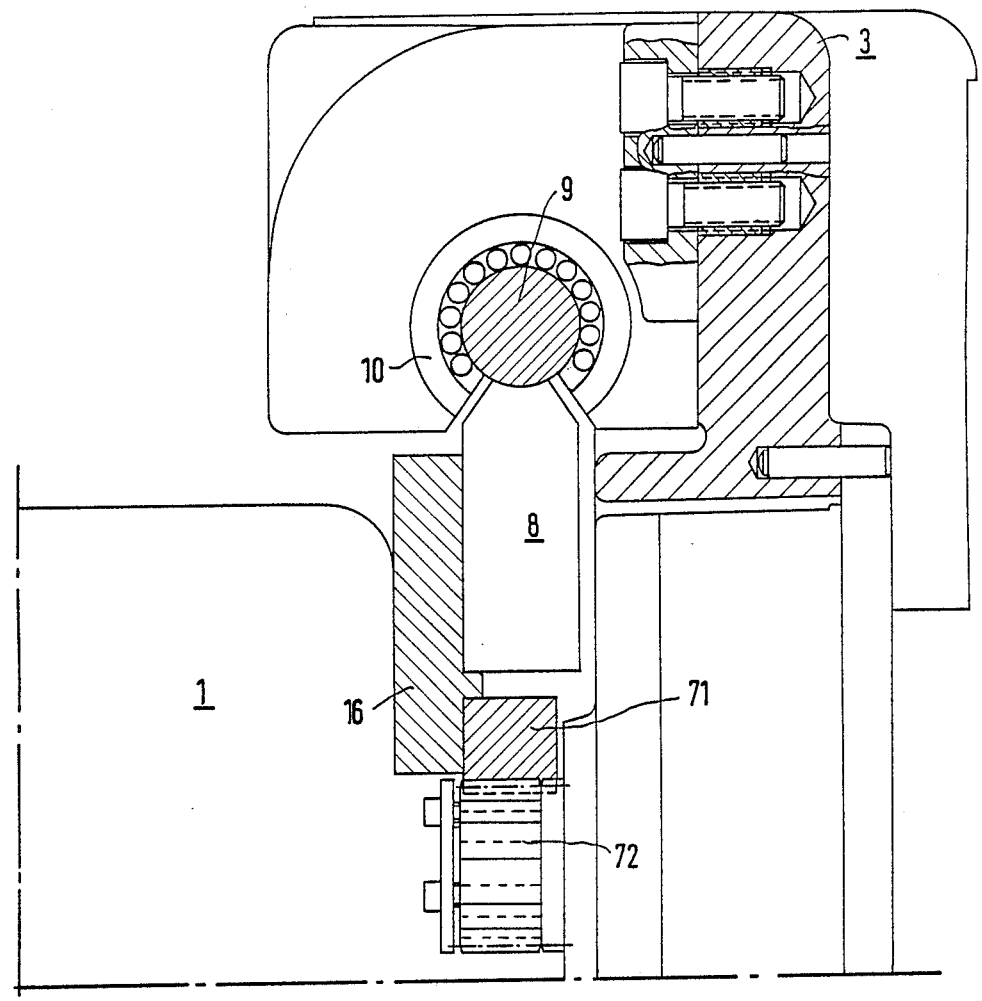
FIG. 2 is a transverse cross-sectional view, on an enlarged scale, of a portion of the gantry arrangement illustrated in FIG. 1, including the elongate guide element of circular cross-section.
Figure 3:
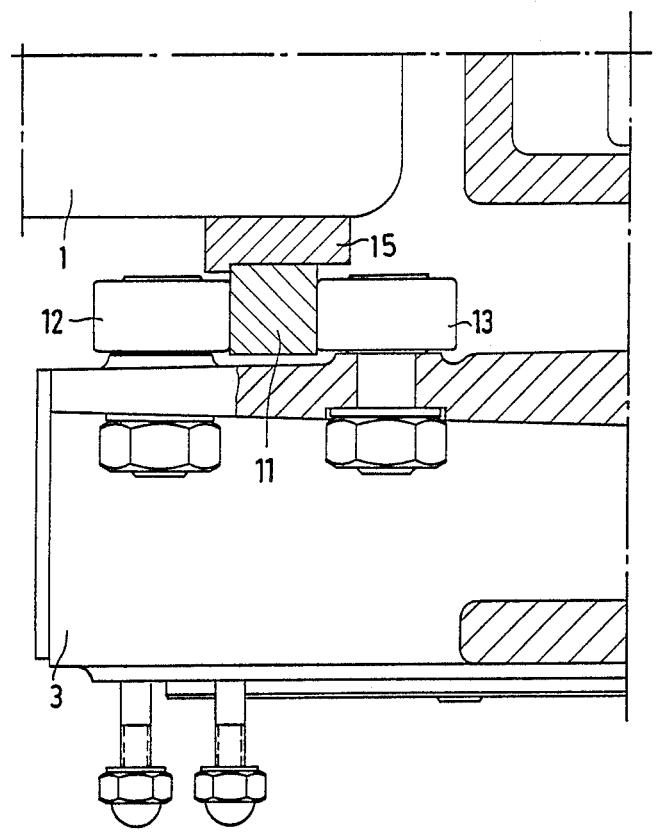
FIG. 3 is a transverse cross-sectional view, on an enlarged scale, of a portion of the gantry arrangement of FIG. 1, including the elongate guide element of rectangular cross-section.

Carriage 3 is preferably a highly stiff aluminum casting having narrow tolerances. The flanging areas for the guidance system and the robot drive can be made in one setting on a machine tool. Carriage 3 is driven by a motor 6 (FIG. 1) via a serrated-belt transmission (not illustrated) and a pinion 72 meshing with a rack 71 fastened to gantry beam 1 via support strip 16 (see FIG. 2). A smooth and quiet motion of carriage 3 along gantry beam 1 may be obtained if rack 71 and pinion 72 respectively take the form of a helically geared rack and an axially divided gear in which the parts are braced against each other.

Electrical power is supplied to carriage 3 and, in particular, to motor 6 via a power supply chain or train accommodated on gantry beam 1 in a U-shaped tray 5.

The use of a pair of elongate guide elements 9 and 11 having circular and rectangular sections respectively, ensures a carriage guidance assembly which is absolutely free of play and which has low friction losses.

The design of a guidance and drive system in a gantry arrangement in accordance with the present invention enables the lining up of an indeterminate number of individual beams in the longitudinal direction whereby the travel distance of the gantry robot can be extended substantially indefinitely. In such an elongated gantry arrangement, circular guide element 9 of each gantry section is centered with respect to the circular guide elements of adjacent gantry sections. In addition, rectangular or flat guide strips 11 abut each other without an abutment transition. Rack 71 extends from one gantry section to another.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. A gantry arrangement for an industrial robot, comprising:
   a gantry beam defining a path of travel of the industrial robot;
   support means for supporting said gantry beam;
   a first elongate guide element having a circular transverse cross-section and extending parallel to said path, said elongate guide element being secured to said gantry beam and made of a rigid material, said first elongate element being disposed proximately to an upper side of said gantry beam;
   a second elongate guide element having a substantially rectangular transverse cross-section and extending parallel to said path, said second elongate guide element being secured to said gantry beam and made of a rigid material, said second elongate guide element being spaced from said first elongate guide element and disposed proximately to a lower side of said gantry beam;
   a carriage carrying the robot;
   first means including a ball sleeve for shiftably mounting said carriage to said first elongate guide element so that said carriage is shiftably supported by said first elongate guide element for motion along said path; and
   second means including at least two rollers rotatably mounted to said carriage and engaging said second elongate guide element for bracing said carriage and preventing rotation thereof about said first elongate guide element.

2. A gantry arrangement as set forth in claim 1 wherein said first and said second elongate guide elements are made of steel.

3. A gantry arrangement as set forth in claim 1 wherein said gantry beam takes the form of a hollow profiled beam, said first and said second elongate guide elements being attached to said gantry beam via respective support strips welded to said gantry beam.

4. A gantry arrangement as set forth in claim 1, further comprising drive means for automatically driving said carriage along said path, said drive means including a divided pinion on said carriage, said pinion cooperating with a rack fastened to said gantry beam.

5. A gantry arrangement for an industrial robot, comprising:
   a gantry beam defining a path of travel of the industrial robot;
   support means for supporting said gantry beam;
   a first elongate guide element having a circular transverse cross-section and extending parallel to said path, said elongate guide element being secured to said gantry beam and made of a rigid material;
   a second elongate guide element having a substantially rectangular transverse cross-section and extending parallel to said path, said second elongate guide element being secured to said gantry beam and made of a rigid material, said second elongate guide element being spaced from said first elongate guide element;
   a carriage carrying the robot;
   first means including a ball sleeve for shiftably mounting said carriage to said first elongate guide element so that said carriage is shiftably supported by said first elongate guide element for motion along said path;
   second means including at least two rollers rotatably mounted to said carriage and engaging said second elongate guide element for bracing said carriage and preventing rotation thereof about said first elongate guide element; and
   drive means for automatically driving said carriage along said path, said drive means including an axially divided pinion on said carriage, said pinion cooperating with a helically geared rack fastened to said gantry beam.

* * * * *